United States Patent [19]

Peever et al.

[11] Patent Number: 5,740,751
[45] Date of Patent: Apr. 21, 1998

[54] MOORING LINE HOOK

[76] Inventors: H. James Peever; William McLean, both of Bay F, 7058 Farrell Road S.E., Calgary, Alberta, Canada, T2H 0T2

[21] Appl. No.: 759,257
[22] Filed: Dec. 2, 1996
[51] Int. Cl.⁶ .................................................. B63B 9/00
[52] U.S. Cl. .................. 114/221 R; 24/601.005; 24/599.004; 114/230
[58] Field of Search ................... 114/221 R, 230; 294/19.1; 24/599.4, 599.6, 599.7, 599.8, 601.5

[56] References Cited

U.S. PATENT DOCUMENTS 4,004,539  1/1977  Wesson ........................... 114/221 R

FOREIGN PATENT DOCUMENTS 3443852   6/1986   Germany ............... 114/221 R
1377764  12/1974   United Kingdom ..... 114/230

Primary Examiner—Ed L. Swinehart

[57] ABSTRACT

It is common practice for pleasure boaters to moor their craft to fixed and buoyed moorings by securing a line from the vessel to a ring attachment on the mooring. To accomplish this normally requires one person standing at the bow to capture the ring on the mooring with a boat hook and lift the mooring ring sufficiently so that a line can be passed through the ring and secured to the boat. This procedure has to be performed from a height of one to three meters above the water and sometimes can be hazardous.

With the present invention, the mooring procedure can be performed with increased safety and with a single action by utilizing a hook mechanism comprising a rigid body and a spring loaded detachable arm attached to a common extension pole and used to pass a line through a continuous ring and recovering said line. The rigid body has guided cavities incorporated at specific locations within the rigid body to receive the detachable arm. The hinged spring loaded detachable arm assembles to the body forming the approximate shape of a closed hook. The arm is temporarily maintained to the body by pressure exerted by a spring at the hinge of the detachable arm. The arm hinged at one end allows the opposite end to lift permitting passage of the ring between the body and the arm. Spring loading of the arm equalizes any forces created when passing the mechanism over the ring. The arm also serves as a retainer for the line being passed through the ring. The combination of the rigid body and hinged spring loaded detachable arm with line attached facilitates passage of the line through a fixed continuous ring and recovery of the line thus forming a line loop around the ring all in one single swift action.

6 Claims, 2 Drawing Sheets

1

MOORING LINE HOOK

SUMMARY OF THE INVENTION

The present invention relates to a line carrier and hooking mechanism for attaching mooring lines typically associated with floating vessels to secure them to fixed or buoyed moorings, docking rails and piles, all of which incorporate ring type mooring attachments.

It is desirable to have a mooring line mechanism that can be attached to a common extension pole whereby, securing a mooring line to a ring type fitting can be easily and safely accomplished at a distance (normally the height of the vessel above the mooring) in a single swift action, thus eliminating the need for the operator to go outboard of the vessel. In that the mooring line is passed through the ring fitting, recovered and secured to the vessel, detaching the mooring line requires no mechanism other than manually releasing one end of the line from the vessel and retrieving the said line.

An example currently used to accomplish the mooring of a vessel to a floating buoy or dock rail requires the operator to capture the mooring with a boat hook or rod, lean outboard of the vessel and have sufficient strength to lift the mooring ring high enough to pass a mooring line through the ring while the vessel is being maneuvered by another person.

This method can be extremely hazardous when the sea is rough or the height of the deck is several meters above the water surface, and to accomplish it quickly, requires reasonable strength and dexterity.

The present invention consists of a hooking type mechanism incorporating a line carrier for passing a line through permanently fixed ring type fittings typically found on mooring buoys, docking rails and mooring piles thus permitting a vessel to be attached by a line for the purposes of securely mooring the vessel while at rest. The hooking mechanism would be used in combination with a standard extension pole of suitable length and incorporating male threads at one end for attachment of the invention.

The hooking mechanism comprises a rigid single element body incorporating a longitudinal cavity on one side to form an open channel. Incorporated into the cavity and specifically located, are parallel concentric radial guides to facilitate a compatible mating part. The body at one extreme end features an open channel with parallel radial guides for positioning and holding in place a compatible mating part. The opposite extreme end incorporates female threads to accommodate a compatible male thread of a common extension pole. A hook shaped, hinged, spring loaded arm detachable from the rigid body forms the additional elements of the hooking mechanism. The arm comprises at least three elements namely, the vertical extension, the longitudinal extension which form the main components of the arm connected to each other by a pin to form a single hinged element. A spring disposed within the hinge applies sufficient force to maintain the hook shape required of the arm in its normal state and, equalizes any forces exerted on the mechanism when passed over the mooring ring thus permitting positive and smooth operation of the mechanism.

The arm in its normal state when viewed in one aspect forms a right angle at one end, a longitudinal length incorporating the hinge and spring with an inward turn of 30 degrees, a further extension along this angle culminating with an end extension at 10 degrees from the 30 degree angle extension. In this aspect all angles are in the same plane. Two parallel concentric radial guide slots are incorporated in the arm on each side of the 10 degree extension and parallel to the extension and, in the vertical extension, the guide slots are matched to accommodate the corresponding guides located within the channels of the rigid body element.

The arm incorporates a line holder whereby a hole is disposed in the vertical extension of the arm. The hole is so positioned and of suitable diameter such that it will readily accept a suitable leader line knotted on the opposite side of the hole through which it is passed, and offering no obstruction to the operating action of the invention.

In combination of all elements of the invention, whereby the detachable arm is positioned on the rigid body, accomplished by inserting the vertical extension of the arm into the open channel end of the body by way of the parallel radial guides, and the longitudinal extension into the cavity within the rigid body by way of the parallel radial guides. Thus presenting a hook shaped mechanism.

In a further embodiment of the invention, the hooking mechanism comprises a rigid body having integral therewith a cavity in one side incorporating parallel concentric radial guides permanently disposed within the cavity, and at one extreme end an open channel also incorporating parallel concentric radial guides permanently disposed within the channel. Connected to but detachable from the rigid body is a hinged spring loaded arm incorporating a line carrier whereby in combination form a hook shape. A female threaded end is provided at one end of the rigid body to facilitate a common extension pole featuring compatible male threads. When utilized the invention provides for passing a line attached to the mechanism through a continuous ring, withdrawing the mechanism with the ring between the body and arm such that the ring by its implied forward motion will detach the arm from the end of the body whereby the mechanism can be raised above the ring and fully withdrawn from the ring. Thus leaving the line looped through with the end retained by the mechanism, whereby the retained line can be withdrawn back to the operator for further securing to a tie-down point aboard the vessel, all in a single swift action without it being necessary for the operator to be outboard of the vessel, hence deeming the procedure to be safer, simpler and more efficient than current methods.

BRIEF DESCRIPTIONS OF THE DRAWINGS

The present invention, as exemplified by a preferred embodiment, is described with reference to the drawings in which.

DETAILED DESCRIPTION OF THE PREFERRED EMBODIMENTS

Figure 1:
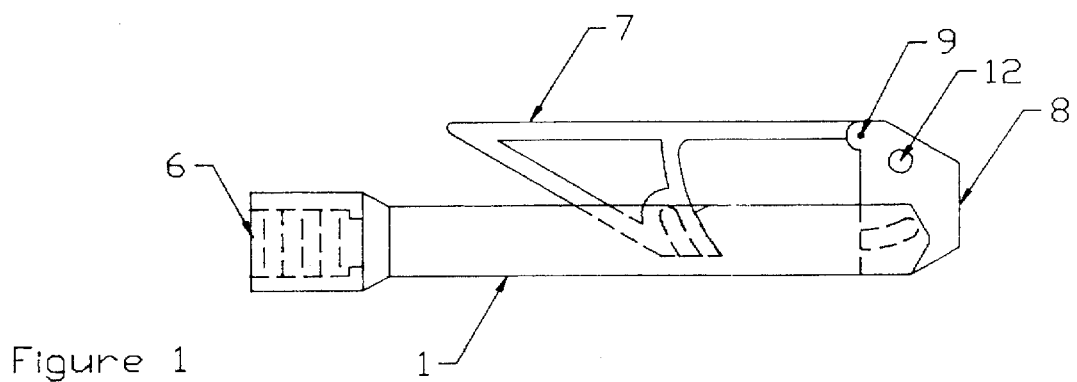
FIG. 1 is a view in side elevation of the mooring line hook embodying the present invention.
Figure 2:
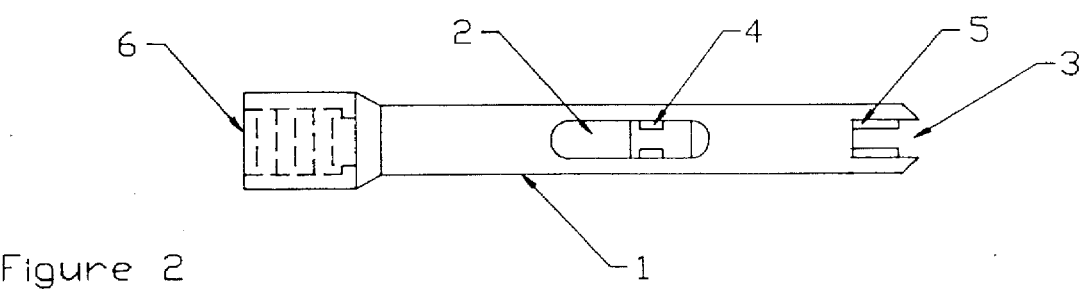
FIG. 2 is a top view of the rigid body of the mooring line hook shown in FIG. 1.
Figure 3:
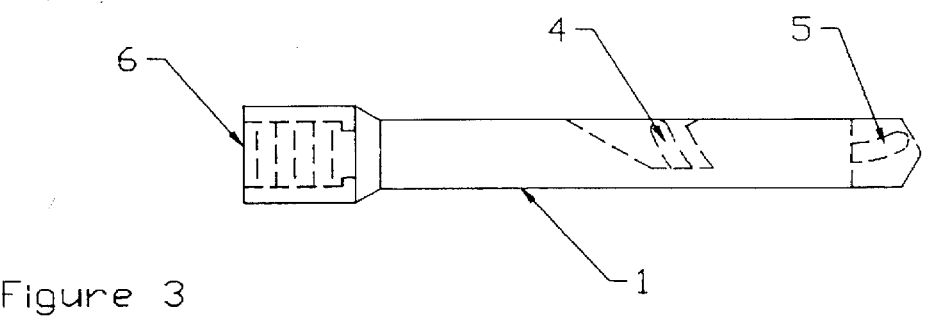
FIG. 3 is a side view of mooring line hook rigid body shown in FIG. 2.
Figure 4:
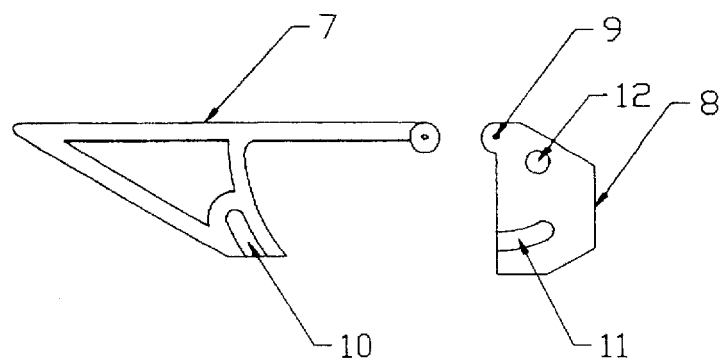
FIG. 4 is an exploded view of the detachable arm of the mooring line hook shown in FIG. 1.

Referring to the drawings, FIGS. 1 through 4, the embodiment of the invention shown comprises a rigid body 1. The body having integral cavities forming open channels 2, 3, incorporated into the channels are parallel concentric radial guides 4, 5, to accommodate matching guide slots 1C, 11, on the longitudinal extension 7, and vertical extension 8, of the detachable arm.

A female threaded connection 6, is provided at the opposite end of the body to facilitate a standard extension pole. Assembled to the body is the hinged 9, spring loaded detachable arm.

In combination, the detachable arm comprises three elements, a vertical extension 8, a longitudinal extension 7, featuring a 30 degree inward turn in the same plane, a pin and spring to form and load the hinge 9. A hole 12, disposed within the vertical extension 8, of the detachable arm, accommodates a polyester or nylon leader line approximately 3 mm in diameter.

Figure 5A:
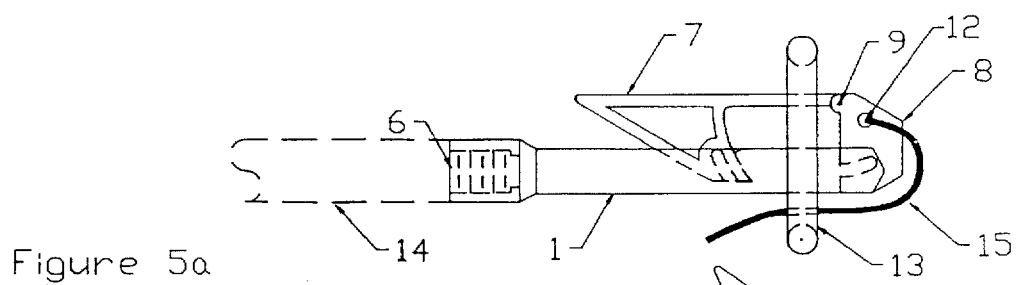
FIG. 5a through 5d is a side elevation of the invention as shown in FIG. 1, further utilized with a ring type fitting and illustrating the operation of the present invention.

As shown in FIG. 5a, when the rigid body 1, hinged detachable arm 7, 8, 9, with leader line 15 is assembled and the mechanism is threaded to a common extension pole 14, the mooring line hook is prepared for use. In operation, one only requires to pass the assembly through a continuous ring 13.

Figure 5B:
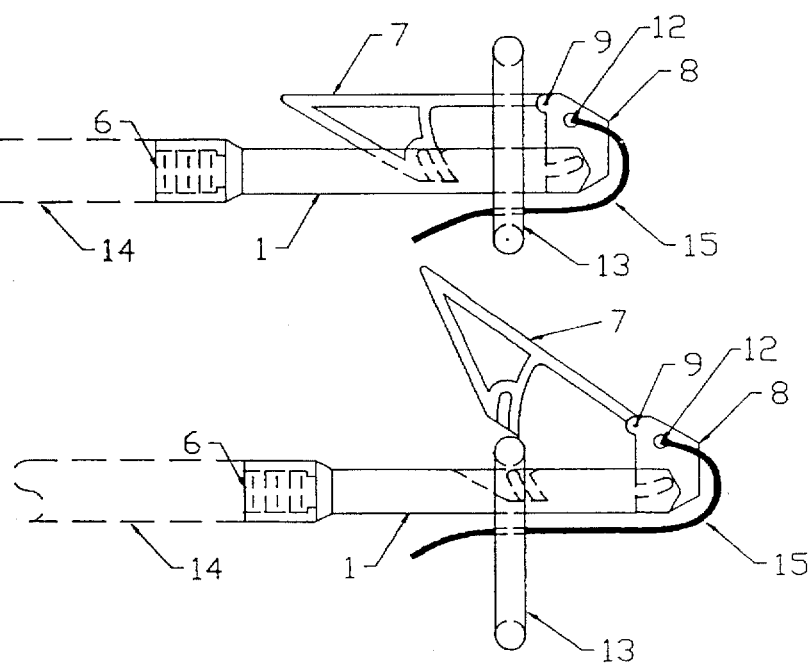

As shown in FIG. 5b, pull the assembly towards oneself such that an arc of the ring 13, passes between the rigid body 1, and the longitudinal arm extension 7, facilitated by the pivoting action of the arm on the hinge 9.

Figure 5C:
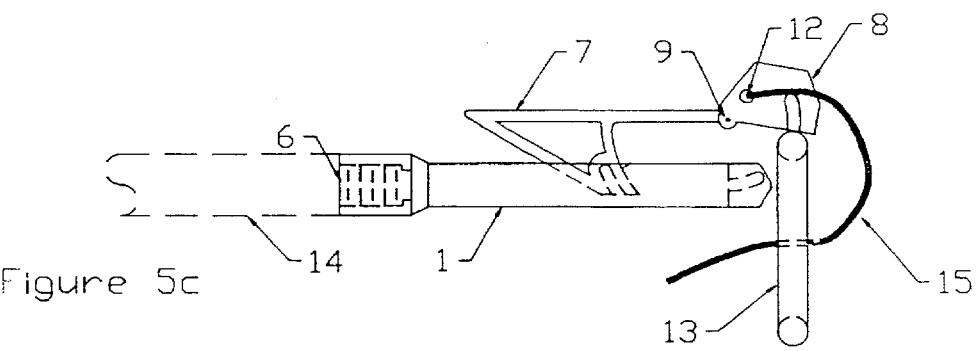

As shown in FIG. 5c, continue withdrawing the assembly, until the vertical arm extension 8, pivots away from the open end of the rigid body 1, exposing a gap sufficient to allow the assembly to be raised clear of the ring 13, and retrieved together with the leader line 15, which has formed a loop around the ring 13.

Figure 5D:
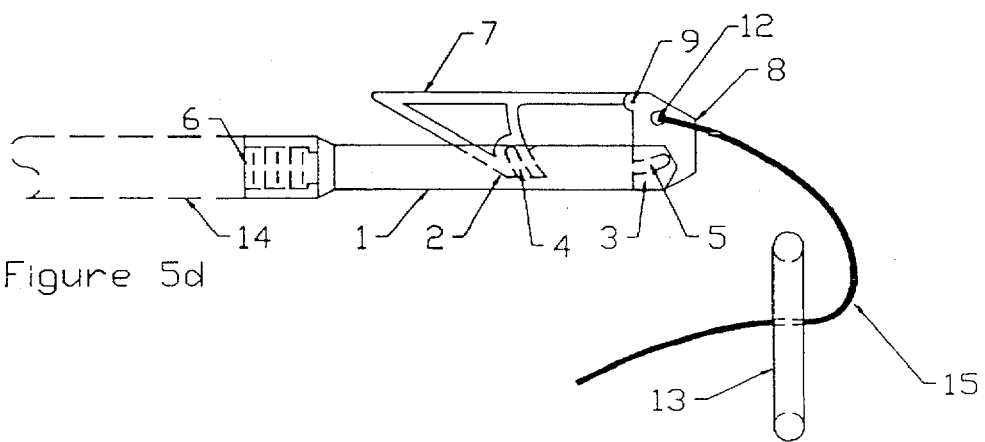

As shown in FIG. 5d, the detachable arm extensions 7, 8, are re-engaged to the body by combination of the pivoting action and spring loading of the arm extensions 7, 8, into their respective body cavities 2, 3, and accurately positioned by the parallel concentric radial guides 4, 5, within the cavities.

A most important feature of the present invention is the inherent ability of the mechanism in combination to automatically reset to its initial prepared state, thus permitting more than one attempt to secure the mooring without requiring the operator to withdraw the mooring hook back to the vessel to manually reset the mechanism prior to proceeding with an additional attempt.

The present invention is preferably constructed of a hard material which can be cast or injection molded and be non corrosive in a marine environment. Examples include materials such as aluminum, poly-urethane and reinforced nylon.

Although the background of this invention relates to mooring of vessels, the invention can be employed for other uses whereby it is required to pass a line over or through straight rods, other lines or formed configurations consistent with the application of the embodiment of the invention.

We claim:

1. A device for passing a line through a closed ring attachment for securing the line thereto, comprising a rigid body member having first and second cavities therein, each cavity having permanent guides disposed therein, a line carrier including two relatively biased hingedly interconnected arm portions, each arm portion including at least one guide slot for mating with the permanent guides in one of the first or second cavities, said rigid body further including a third cavity for receiving external threads of an extension pole.

2. A device for passing a line as set forth in claim 1, wherein said guides of said first cavity lie along an arc of a first circle, and said guides of said second cavity lie along an arc of a second circle, said first and second circles being concentric.

3. A device for passing a line as set forth in claim 1, wherein said line carrier is provided with a hole for receiving a line.

4. A device for passing a line as set forth in claim 1, wherein said third cavity is internally threaded.

5. A device for passing a line as set forth in claim 1, wherein said line carrier automatically resets to an original state with the arm portion guide slots received within the first and second cavities, after one of the arm portions having been displaced therefrom.

6. A device for passing a line as set forth in claim 1, wherein said device is for the attachment of a mooring line of a vessel to a mooring location carrying said closed ring attachment.

* * * * *